United States Patent
Kim et al.

(10) Patent No.: US 9,479,793 B2
(45) Date of Patent: *Oct. 25, 2016

(54) METHOD AND APPARATUS FOR ENCODING/DECODING A MOTION VECTOR BY SELECTING A SET OF PREDICTED CANDIDATE MOTION VECTORS, AND METHOD AND APPARATUS FOR IMAGE ENCODING/DECODING USING THE SAME

(71) Applicant: SK TELECOM CO., LTD., Seoul (KR)

(72) Inventors: Sunyeon Kim, Seoul (KR); Jeongyeon Lim, Seongnam-si (KR); Gyumin Lee, Seongnam-si (KR); Jaehoon Choi, Seongnam-si (KR); Yonggoo Kim, Seoul (KR); Yoonsik Choe, Goyang-si (KR); Yungho Choi, Anyang-si (KR)

(73) Assignee: SK TELECOM CO., LTD., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 15/158,371

(22) Filed: May 18, 2016

(65) Prior Publication Data

US 2016/0269741 A1    Sep. 15, 2016

Related U.S. Application Data

(63) Continuation of application No. 13/510,791, filed as application No. PCT/KR2010/007839 on Nov. 8, 2010, now Pat. No. 9,363,530.

(30) Foreign Application Priority Data

Nov. 18, 2009  (KR) .................... 10-2009-0111302

(51) Int. Cl.
*H04N 7/32* (2006.01)
*H04N 19/52* (2014.01)
(Continued)

(52) U.S. Cl.
CPC .............. *H04N 19/52* (2014.11); *H04N 19/13* (2014.11); *H04N 19/176* (2014.11); *H04N 19/70* (2014.11)

(58) Field of Classification Search
None
See application file for complete search history.

(56) References Cited

U.S. PATENT DOCUMENTS 8,351,509 B1 * 1/2013 Hurd ...................... H04N 19/56
                                                         375/240.16
9,363,530 B2 * 6/2016 Kim ....................... H04N 19/52
(Continued)

FOREIGN PATENT DOCUMENTS

JP    2005-528709 A    9/2005
JP    2006-512029 A    4/2006
(Continued)

OTHER PUBLICATIONS

International Search Report for PCT/KR2010/007839.
(Continued)

*Primary Examiner* — Andy Rao
*Assistant Examiner* — Tyler Edwards
(74) *Attorney, Agent, or Firm* — Hauptman Ham, LLP

(57) ABSTRACT

A video encoding apparatus using an inter-prediction includes: a video encoder to determine a current motion vector of a current block, predict the current block by using the determined current motion vector, and encode a residual block representing a difference between the predicted block and the current block; and a motion vector encoder to determine a candidate predicted motion vector set based on motion information of neighboring blocks of the current block, select a predicted motion vector of the current motion vector from among the two candidate predicted motion vectors in the candidate predicted motion vector set, and encode a differential vector representing a difference between the current motion vector and the selected predicted motion vector and a predicted motion vector index indicating the selected predicted motion vector among the two candidate predicted motion vectors.

14 Claims, 10 Drawing Sheets

(51) Int. Cl.
*H04N 19/176* (2014.01)
*H04N 19/70* (2014.01)
*H04N 19/13* (2014.01)

(56) References Cited

U.S. PATENT DOCUMENTS

| | | | |
|---|---|---|---|
| 2005/0226462 A1* | 10/2005 | Wittebrood | G06T 7/2026 382/103 |
| 2006/0098737 A1 | 5/2006 | Sethuraman et al. | |
| 2008/0240242 A1 | 10/2008 | Lainema | |
| 2009/0067503 A1 | 3/2009 | Jeong et al. | |

FOREIGN PATENT DOCUMENTS

| | | |
|---|---|---|
| JP | 2009-147757 A | 7/2009 |
| KR | 10-2007-00794111 A | 8/2007 |
| WO | 03/102872 A3 | 12/2003 |
| WO | 2004/057460 A3 | 7/2004 |
| WO | 2007/081116 A1 | 7/2007 |
| WO | 2007/089068 A1 | 8/2007 |

OTHER PUBLICATIONS

Chinese Office Action dated Aug. 29, 2014.

\* cited by examiner

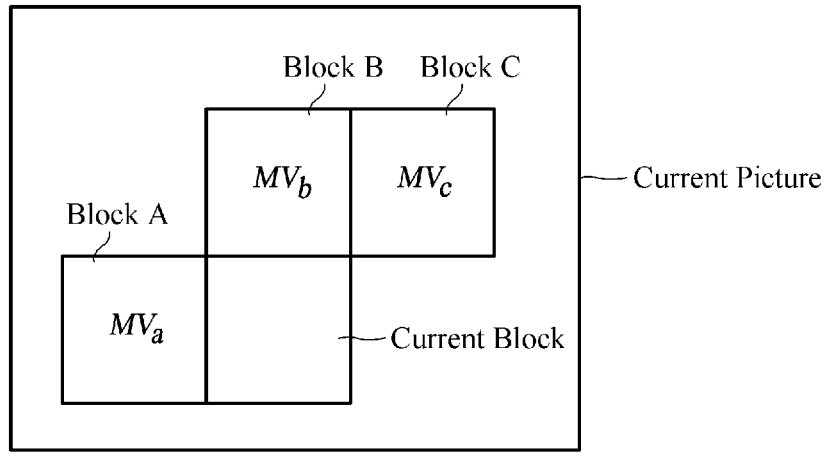
FIG. 3A
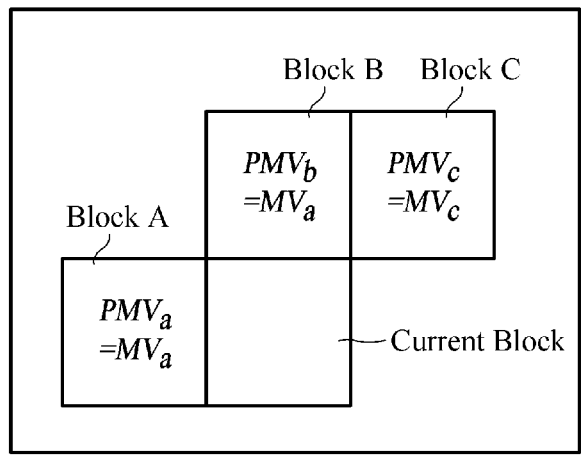
FIG. 3B
Motion Information Of Neighboring Blocks = {$MV_a$, $MV_b$, $MV_c$, $PMV_a$, $PMV_b$, $PMV_c$}
FIG. 3C

METHOD AND APPARATUS FOR ENCODING/DECODING A MOTION VECTOR BY SELECTING A SET OF PREDICTED CANDIDATE MOTION VECTORS, AND METHOD AND APPARATUS FOR IMAGE ENCODING/DECODING USING THE SAME

CROSS-REFERENCE TO RELATED APPLICATIONS

The instant application is a continuation of U.S. patent application Ser. No. 13/510,791 filed Aug. 10, 2012, which is the National Phase application of International Application No. PCT/KR2010/007839, filed on Nov. 8, 2010, which claims the priority to Korean Patent Application No. 10-2009-0111302, filed on Nov. 18, 2009. The disclosures of above-listed applications are hereby incorporated by reference herein in their entirety.

TECHNICAL FIELD

The present disclosure relates to a method and apparatus for encoding/decoding a motion vector by selecting a set of predicted candidate motion vectors, and a method and apparatus for video encoding/decoding using the same. More particularly, the present disclosure relates to a method and an apparatus for improving the image compression efficiency by efficiently compressing a motion vector used for performing a predictive encoding on an image.

BACKGROUND

The statements in this section merely provide background information related to the present disclosure and may not constitute prior art.

In the typical image compression techniques such as H.264/AVC to perform a predictive encoding on a motion vector obtained by an estimation of a motion based on a block, the motion vector to be encoded is compressed by determining a predicted motion vector by using a median of motion vectors of neighboring blocks of the block to be encoded and by variable-length encoding a differential between the motion vector and a predicted motion vector.

The International Telecommunications Union-Telecommunication Video Coding Expert Group (ITU-T VCEG) has developed a codec named Key Technical Area (KTA) having a better performance based on the H.264/AVC standard, and improved the existing H.264/AVC motion vector encoding method through a method called MVComp (Competition-based Motion Vector Coding).

MVComp is a method of selecting a predicted motion vector candidate having a minimum value of a differential between a current motion vector and a motion vector obtained by a prediction from a plurality of predicted candidate motion vectors and transmitting information on a selected predicted candidate motion vector to a decoder, and achieving an improvement in encoding compression efficiency by 5% compared to that of the existing H.264/AVC standard. However, MVComp has a drawback in that the quantity of indexing side information to be transmitted to the decoder increases as the number of predicted motion vector candidates increases.

In this respect, there were suggestions including a technique for an encoder to select one motion vector from a plurality of predicted candidate motion vectors, which is presumably the most similar to a current motion vector and transmitting side information for identifying only whether the selected motion vector is an optimum motion vector. However, the proposed techniques have problems of a decoder crash of failing to reconstruct the current frame and frames occurring before a next intra frame due to an error generated in a previous frame and an increase of an amount of calculations demanded of the decoder.

Accordingly, methods have been proposed to determine the motion vector of a block to be currently encoded by using motion vectors around the current block. The inventor(s) has experienced that the methods address the decoder crash problem by efficiently transmitting indexing side information by using motion vectors of neighboring blocks and selecting a predicted motion vector apart from information on a previous frame. However, the inventor(s) has experienced that since the methods use a limited number of motion vector candidates, the compression performance is disadvantageously limited.

SUMMARY

In accordance with an aspect of the present disclosure, a video encoding apparatus using an inter-prediction comprises a video encoder, and a motion vector encoder. The video encoder is configured to determine a current motion vector of a current block, predict the current block by using the determined current motion vector, and encode a residual block representing a difference between the predicted block and the current block. And the motion vector encoder is configured to determine a candidate predicted motion vector set based on motion information of neighboring blocks of the current block, wherein the candidate predicted motion vector set has two candidate predicted motion vectors for the current motion vector, select a predicted motion vector of the current motion vector from among the two candidate predicted motion vectors in the candidate predicted motion vector set, and encode a differential vector representing a difference between the current motion vector and the selected predicted motion vector and a predicted motion vector index indicating the selected predicted motion vector among the two candidate predicted motion vectors.

In accordance with an aspect of the present disclosure, a video decoding apparatus using an inter-prediction comprises: a motion vector decoder, and a video decoder. The motion vector decoder is configured to reconstruct a differential vector and a predicted motion vector index by decoding motion vector data included in a bitstream, determine a candidate predicted motion vector set by using motion information of neighboring blocks of a current block, wherein the candidate predicted motion vector set has two candidate predicted motion vectors for a current motion vector of the current block, select a candidate predicted motion vector identified by the reconstructed predicted motion vector index from among the two candidate predicted motion vectors in the candidate predicted motion vector set, as a predicted motion vector of the current motion vector, and reconstruct the current motion vector of the current block by adding the reconstructed differential vector and the selected predicted motion vector. And the video decoder is configured to generate a predicted block of the current block by using the reconstructed current motion vector, reconstruct a residual block from an image data extracted from the bitstream, and reconstruct the current block by adding the predicted block and the residual block.

BRIEF DESCRIPTION OF DRAWINGS

FIGS. 3A to 3C are exemplary diagrams illustrating motion information of neighboring blocks according to an aspect of the present disclosure;

DETAILED DESCRIPTION

Figure 1:
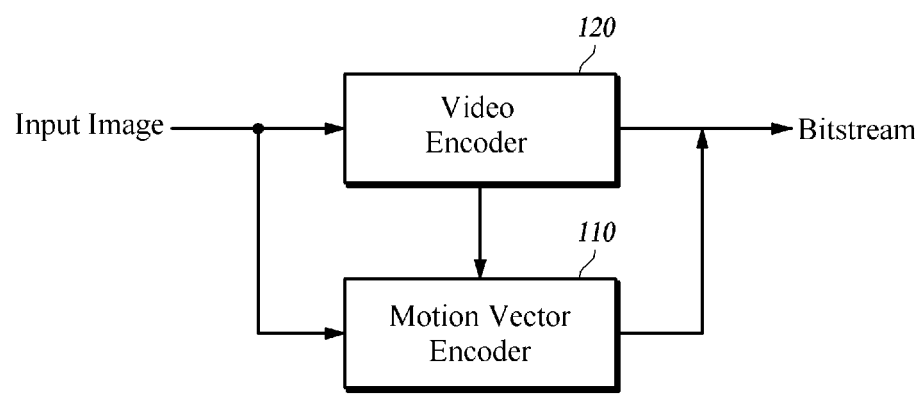
FIG. 1 is a block diagram schematically illustrating a video encoding apparatus according to an aspect of the present disclosure.

Hereinafter, embodiments of the present disclosure will be described in detail with reference to the accompanying drawings. In the following description, the same elements will be designated by the same reference numerals although they are shown in different drawings. Further, in the following description of the present disclosure, a detailed description of known functions and configurations incorporated herein will be omitted when it may make the subject matter of the present disclosure rather unclear.

Various embodiment of the present disclosure provide efficiently compressing a motion vector and thus improve the image compression efficiency by encoding the motion vector through the use of a predicted motion vector which is more similar to the motion vector to be encoded but decreasing the amount of bits generated by encoding the motion vector.

Additionally, in describing the components of the present disclosure, there may be terms used like first, second, A, B, (a), and (b). These are solely for the purpose of differentiating one component from the other but not to imply or suggest the substances, order or sequence of the components. If a component were described as 'connected', 'coupled', or 'linked' to another component, they may mean the components are not only directly 'connected', 'coupled', or 'linked' but also are indirectly 'connected', 'coupled', or 'linked' via a third component.

A motion vector encoding apparatus, a motion vector decoding apparatus, a video encoding apparatus, and a video decoding apparatus described hereinafter may be user terminals including a personal computer or PC, notebook or laptop computer, personal digital assistant or PDA, portable multimedia player or PMP, PlayStation Portable or PSP, or mobile communication terminal, or server terminals including an application server and a service server, and represent a variety of apparatuses equipped with, for example, a communication device such as a modem for carrying out communication between various devices or wired/wireless communication networks, a memory for storing various programs for encoding or decoding a motion vector or encoding or decoding a video and related data, and a microprocessor for executing the programs to effect operations and controls.

In addition, the motion vector or the video encoded into a bitstream by the motion vector encoding apparatus or the video encoding apparatus may be transmitted in real time or non-real-time to the motion vector decoding apparatus and the video decoding apparatus, so that the encoded motion vector is reconstructed as a motion vector by decoding in the motion vector decoding apparatus or the encoded video is reconstructed into the video by decoding in the video decoding apparatus, and thus the motion vector or the video is reproduced.

A video typically includes a series of pictures each of which is divided into predetermined areas, such as blocks. When each picture is divided into blocks, each of the blocks is classified into an intra block or an inter block depending on an encoding method. The intra block means a block that is encoded through an intra predictive encoding which is within a current picture where the current encoding is performed for generating a predicted block by predicting a current block using pixels of a reconstructed block that underwent previous encoding and decoding and then encoding the differential value of the predicted block from the pixels of the current block. The inter block means a block that is encoded through an inter predictive encoding which generates the predicted block by predicting the current block in the current picture through referencing one or more past pictures or future pictures and then encoding the differential value of the predicted block from the current block. Here, the picture that is referenced in encoding or decoding the current picture is called a reference picture.

FIG. 1 is a block diagram schematically illustrating a video encoding apparatus according to an aspect of the present disclosure.

The video encoding apparatus 100 according to an aspect of the present disclosure, which is an apparatus for encoding a video, may include a motion vector encoder 110 and a video encoder 120.

The motion vector encoder 110 selects a predicted motion vector from a predicted candidate motion vector set selected based on motion information of neighboring blocks of a current block among a plurality of predicted candidate motion vector sets, and encodes a differential motion vector, which is a difference between a current motion vector and the selected predicted motion vector, and a predicted motion vector index indicating the selected predicted motion vector. A differential motion vector data is generated by encoding the differential motion vector and an index data is generated by encoding the predicted motion vector index. Accordingly, the motion vector encoder 110 generates a motion vector data including the differential motion vector data and a group index data.

Here, the motion vector encoder 110 generates the differential motion vector by using a current motion vector determined for performing a predictive encoding on the current block in the video encoder 120. The motion vector encoder 110 will be discussed in the following description in more detail.

The video encoder 120 determines a current motion vector that is a motion vector of the current block and performs a predictive encoding on the current block by using the current motion vector. As such, by performing the predictive encoding on the current block, an image data is generated.

To this end, the video encoder 120 may include a predictor, a subtracter, a transformer and quantizer, and an encoder, and further include an inverse transformer and inverse quantizer, an adder, a deblocking filter, etc. Here, the predictor generates a predicted block by determining the current motion vector through estimation of a motion of the current block and compensating for the motion of the current block by using the determined motion vector. The subtracter generates a residual block by subtracting the predicted block from the current block. The transformer and quantizer generate a transformed and quantized coefficient by transforming and quantizing the residual block. The encoder generates the image data by encoding the transformer and quantized coefficient. Further, the inverse quantizer and inverse transformer reconstruct the residual block by inversely quantizing and inversely transforming the transformed and quantized coefficient. The adder reconstructs the current block by reconstructing the predicted block and the reconstructed residual block. The reconstructed current block is deblocking-filtered by a deblocking filter, accumulated in the memory in the unit of pixels, and stored as a reference picture, and is used for prediction of a next block or a next picture.

Figure 2:
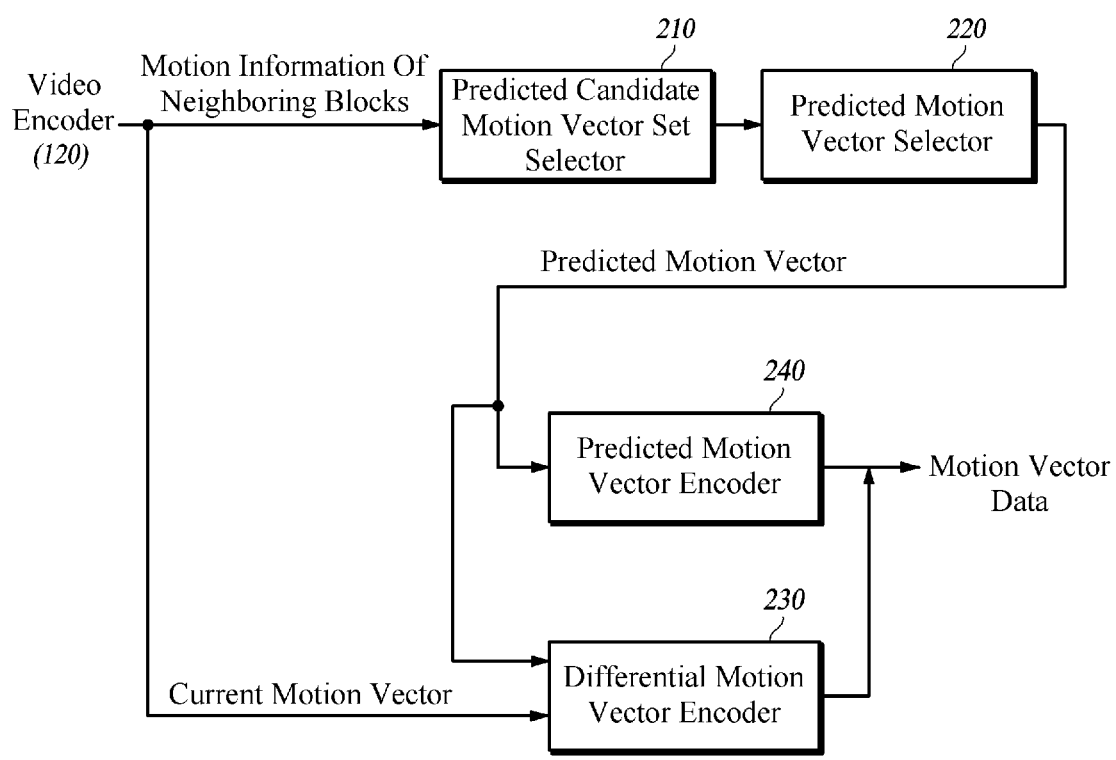
FIG. 2 is a block diagram schematically illustrating a motion vector encoding apparatus according to an aspect of the present disclosure.

FIG. 2 is a block diagram schematically illustrating a motion vector encoding apparatus according to an aspect of the present disclosure.

The motion vector encoding apparatus according to the aspect of the present disclosure may be implemented as the motion vector encoder 110 in the video encoding apparatus 100 aforementioned with reference to FIG. 1, and so is called the motion vector encoder 110 for convenience of description hereinafter.

The motion vector encoder 110 includes a predicted candidate motion vector set selector 210, a representative predicted motion vector selector 220, a predicted motion vector selector 230, a differential motion vector encoder 240, and a predicted motion vector encoder 250.

The predicted candidate motion vector set selector 210 selects one predicted candidate motion vector set from a plurality of predicted candidate motion vector sets by using motion information of neighboring blocks of the current block.

According to an aspect of the present disclosure, the neighboring blocks refer to blocks located in surroundings of the current block among pre-reconstructed blocks, which have been already encoded and decoded before a decoding of the current block in a current picture including the current block. The neighboring blocks can be blocks adjacent to the current block, but the neighboring blocks are not limited to the blocks adjacent to the current block. The motion information of the neighboring blocks refers to obtained information related to a motion vector with respect to reconstructed neighboring blocks, which have been pre-encoded and pre-decoded, and may be motion vectors and predicted motion vectors of the neighboring blocks, etc.

FIGS. 3A to 3C are exemplary diagrams illustrating motion information of neighboring blocks according to an aspect of the present disclosure;

FIG. 3A illustratively shows neighboring blocks of a current block and motion vectors of the neighboring blocks. If it is assumed that a block adjacent to a left side of the current block among blocks located in surroundings of the current block is block A, a block adjacent to an upper side of the current block is block B, and a block adjacent to an upper right side of the current block is block C, the blocks A, B, and C can be neighboring blocks of the current block. In this event, the blocks A, B, and C are all reconstructed blocks, which have been already encoded and decoded before an encoding of the current block. Although FIG. 3A illustrates only the blocks A, B, and C as the neighboring blocks of the current block, the neighboring blocks are not limited thereto and other blocks such as a block located in an upper left side of the current block can be used as the neighboring block.

In FIG. 3A, $MV_a$, $MV_b$, and $MV_c$ are motion vectors of the blocks A, B, and C, respectively. The motion vectors of the blocks A, B, and C are already determined when each of the blocks is encoded and stored in a buffer or a memory of the video encoding apparatus 100 or the motion vector encoder 110, so that the motion vectors correspond to information, which can be obtained and used whenever the video encoding apparatus 100, the motion vector encoder 110, or the predicted candidate motion vector set selector 210 encodes the current block or a motion vector of the current block.

FIG. 3B illustratively shows predicted motion vectors of neighboring blocks. In FIG. 3B, $PMV_a$, $PMV_b$, and $PMV_c$ are predicted motion vectors of the blocks A, B, and C, respectively. The predicted motion vectors are also already determined when each of the blocks is encoded and stored in a buffer or a memory of the video encoding apparatus 100 or the motion vector encoder 110, so that the predicted motion vectors correspond to information, which can be obtained and used whenever the video encoding apparatus 100, the motion vector encoder 110, or the predicted candidate motion vector set selector 210 encodes the current block or the motion vector of the current block.

Accordingly, in examples of FIGS. 3A and 3B, the motion information of the neighboring blocks can be MVa, MVb, MVc, PMVa, PMVb, and PMVc as shown in FIG. 3C.

As shown in FIGS. 3A to 3C, the predicted candidate motion vector set selector 210 can select one predicted candidate motion vector set from a plurality of predicted candidate motion vector sets by using the motion vectors and the predicted motion vectors of the neighboring blocks as the motion information of the neighboring blocks.

For example, the predicted candidate motion vector set selector 210 can determine whether there is a motion of a camera by using the motion information of the neighboring blocks, and select one predicted candidate motion vector set from a plurality of predicted candidate motion vector sets based on the motion of the camera. To this end, the predicted candidate motion vector set selector 210 can determine whether there is the motion of the camera by determining whether the number of neighboring blocks of which motion vectors are zero vectors among the neighboring blocks is equal to or larger than a preset number. That is, the predicted candidate motion vector set selector 210 can determine that there is no motion of the camera when the number of neighboring blocks of which motion vectors are zero vector is equal to or larger than the preset number, and determine that there is the motion of the camera when the number of neighboring blocks of which motion vectors are zero vector is smaller than the preset number.

In examples of FIGS. 3A to C, if it is assumed that the motion vectors $MV_a$, $MV_b$, and $MV_c$ of the neighboring blocks are (0, 0), (0, 0), and (0, 1), respectively, the preset number for determining whether there is the motion of the camera is set to 2, and two predicted candidate motion vector sets $\{MV_a, MV_{H.264}\}$ and $\{MV_a, MV_{extspa}\}$ are set as the plurality of predicted candidate motion vector sets, the predicted candidate motion vector set $\{MV_a, MV_{H.264}\}$ including $MV_{H.264}$ can be selected as a predicted candidate motion vector set because the number of neighboring blocks of which motion vectors are zero vectors, which corresponds to 2, is equal to or larger than the preset number, which corresponds to 2, and thus it is determined that there is no motion of the camera. In this event, if it is assumed that the motion vectors $MV_a$, $MV_b$, and $MV_c$ of the neighboring blocks are (0, 0), (1, 0), and (0, 1), respectively, the predicted candidate motion vector set $\{MV_a, MV_{extspa}\}$ including $MV_{extspa}$ can be selected as the predicted candidate motion vector set because the number of neighboring blocks of which motion vectors are zero vectors, which corresponds to 1, is smaller than the preset number, which corresponds to 2, and thus it is determined that there is the motion of the camera.

In this event, it is only an example that the set including $MV_{H.264}$ is selected as the predicted candidate motion vector set when it is determined that there is no motion of the camera and the set including $MV_{extspa}$ is selected as the predicted candidate motion vector set when it is determined that there is the motion of the camera. Further, it is not always required to select the set including $MV_{H.264}$ or $MV_{extspa}$ and, instead, it is possible to empirically determine, through an experiment, a specific set to be selected, which includes a specific predicted candidate motion vector. That is, a predicted candidate motion vector to be selected according to whether there is the motion of the camera and included in the predicted candidate motion vector set can be empirically determined through an experiment, and data empirically determined as described above can be preset and stored in the video encoding apparatus 110 and the video decoding apparatus.

For another example, the predicted candidate motion vector set selector 210 can determine object motions of the neighboring blocks by using the motion information of the neighboring blocks, and select one predicted candidate motion vector set from the plurality of predicted candidate motion vector sets based on the determined object motions of the neighboring blocks. To this end, the predicted candidate motion vector set selector 210 can determine the object motions of the neighboring blocks by using predicted motion vectors of the neighboring blocks. That is, the predicted candidate motion vector set selector 210 can analyze the predicted motion vectors of the neighboring blocks as the motion information of the neighboring blocks in order to determine the object motions of the neighboring blocks, select one or more predicted candidate motion vectors from available predicted candidate motion vectors according to a distribution of the analyzed predicted motion vectors of the neighboring blocks, and select a predicted candidate motion vector set including the selected one or more predicted candidate motion vectors from a plurality of predicted candidate motion vector sets as one predicted candidate motion vector set.

In examples of FIGS. 3A to 3C, if it is assumed that three predicted candidate motion vector sets $\{MV_a, MV_{H.264}\}$, $\{MV_b, MV_{H.264}\}$, $\{MV_c, MV_{H.264}\}$ are set as a plurality of set predicted candidate motion vector sets, the predicted motion vectors $PMV_a$, $PMV_b$, and $PMV_c$ of the neighboring blocks are $MV_a$, $MV_b$, and $MV_c$, respectively. In this event, through selecting $MV_b$ from available predicted candidate motion vectors such as $MV_a$, $MV_b$, $MV_c$, $MV_{H.264}$, and $MV_{extspa}$, $\{MV_b, MV_{H.264}\}$ including $MV_b$ can be selected as a predicted candidate motion vector set based on an assumption that $MV_b$ has the higher probability of being selected as a predicted motion vector of a current block than $MV_a$ or $MV_c$. In this event, it is an only example that $MV_b$ has the higher probability of being selected as the predicted motion vector of the current block than $MV_a$ or $MV_c$ when the predicted motion vectors $PMV_a$, $PMV_b$, and $PMV_c$ of the neighboring blocks are $MV_a$, $MV_b$, and $MV_c$, respectively, and the predicted motion vector of the current block can be empirically determined through an experiment. That is, the predicted candidate motion vector, which is to be selected according to the distribution of the predicted motion vectors of the neighboring blocks and included in the predicted candidate motion vector set, can be empirically determined through an experiment, and data empirically determined as described above can be preset and stored in the video encoding apparatus 110 and the video decoding apparatus.

Figure 4:
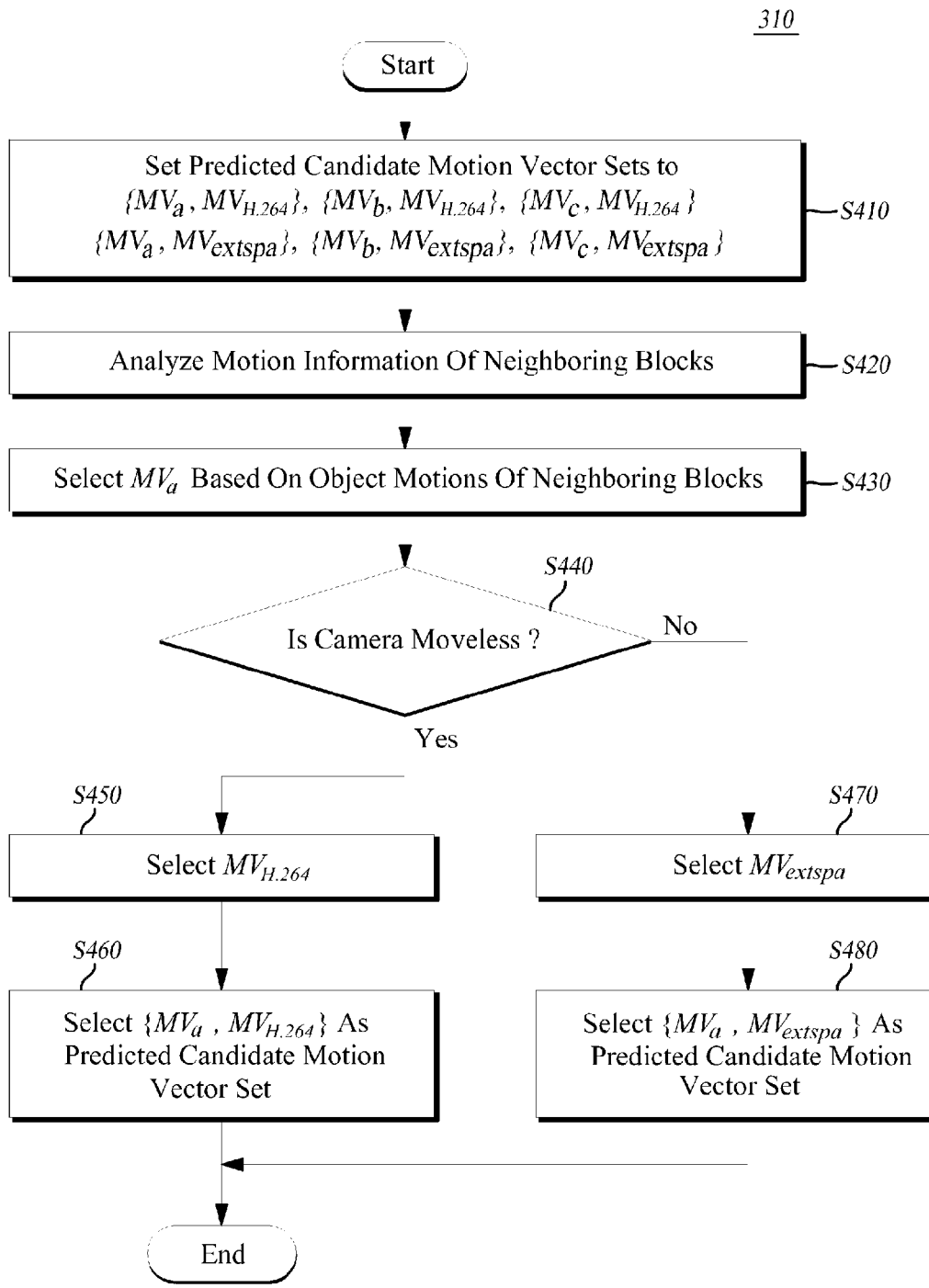
FIG. 4 is an exemplary diagram illustrating an implementation of a method of selecting a set of predicted candidate motion vectors according to an aspect of the present disclosure.

For yet another example, as shown in FIG. 4, one predicted candidate motion vector set can be selected from a plurality of predicted candidate motion vector sets based on both the object motions of the neighboring blocks and whether there is the motion of the camera.

FIG. 4 is an exemplary diagram illustrating an implementation of a method of selecting a set of predicted candidate motion vectors according to an aspect of the present disclosure.

When a plurality of predicted candidate motion vector sets are set to $\{MV_a, MV_{H.264}\}$, $\{MV_b, MV_{H.264}\}$, $\{MV_c, MV_{H.264}\}$, $\{MV_a, MV_{extspa}\}$, $\{MV_b, MV_{extspa}\}$, and $\{MV_c, MV_{extspa}\}$ at step S410, the predicted candidate motion vector set selector 210 analyzes motion information of neighboring blocks at step S420, to select $MV_a$ from the available predicted candidate motion vectors as similarly described in the aforementioned example based on the object motions of the neighboring blocks at step S430, determines whether there is a camera motion at step S440, selects $MV_{H.264}$ when there is no camera motion at step S450 to select $\{MV_a, MV_{H.264}\}$ as a predicted candidate motion vector set at step S460, and selects $MV_{extspa}$ when there is the camera motion at step S470 to select $\{MV_a, MV_{extspa}\}$ as the predicted candidate motion vector set at step S480.

Although it has been exemplified in FIGS. 3 and 4 that the number of plural predicted candidate motion vector sets is 2, 3, and 6, the number of predicted candidate motion vector sets can be limitlessly set to 2 or more. Further, although it has been exemplified in FIGS. 3 and 4 that each of the predicted candidate motion vector sets includes two predicted candidate motion vectors, the number of predicted candidate motion vectors is not limited thereto and two or more predicted candidate motion vectors can be included.

Referring back to FIG. 2, the predicted motion vector selector 220 selects one predicted candidate motion vector from predicted candidate motion vectors within the selected predicted motion vector set as the predicted motion vector. To this end, the predicted motion vector selector 220 can select an optimal predicted candidate motion vector in an aspect of a rate-distortion cost from predicted candidate motion vectors included in the predicted candidate motion vector set selected by the predicted candidate motion vector set selector 210 as the predicted motion vector. Here, the optimal predicted candidate motion vector in an aspect of the rate-distortion cost refers to a predicted candidate motion vector having the smallest rate-distortion cost of a bitstream generated by encoding a current motion vector and a current block by using each of corresponding predicted candidate motion vectors.

For example, if it is assumed that the predicted candidate motion vector set selected by the predicted motion vector selector 220 is $\{MV_a, MV_{H.264}\}$, the predicted motion vector can be selected by using Formula 1.

$$BMVI = \underset{I}{\operatorname{argmin}}\left[\sum_{i}\sum_{j}|x_{i,j} - \hat{x}_{i,j}| + \lambda \cdot \{R(MV_c - MV_I) + R(I)\}\right] \quad \text{Formula 1}$$

In Formula 1, BMVI (Best Motion Vector Index) denotes a predicted motion vector index for identifying a predicted motion vector selected by the predicted motion vector selector 220, $x_{i,j}$ denotes a pixel value for a coordinate (i, j) of a current pixel, $\hat{x}_{i,j}$ denotes a pixel value for a coordinate (i, j) of a reference pixel, and R(MV-MVI) and R(I) denote values calculated from an amount of bits spent on encoding a difference between the motion vector of the current block and the predicted motion vector and an amount of bits spent on encoding the predicted motion vector index, respectively.

The differential motion vector encoder 230 encodes a differential motion vector, which is a difference between the current motion vector which is a motion vector of the current block and the selected predicted motion vector. That is, the differential motion vector encoder 230 generates the differential motion vector by subtracting the predicted motion vector selected by the predicted motion vector selector 220 from the current motion vector, and generates a differential motion vector data by encoding the differential motion vector. For example, if it is assumed that the predicted motion vector selected by the predicted motion vector selector 220 is $MV_a$, the differential motion vector can be calculated as defined in Formula 2. In Formula 2, DMV denotes a differential motion vector, and MV denotes a current motion vector.

$$DMV=MV_c-MV_a \quad \text{Formula 2}$$

However, when the predicted motion vector selector 220 obtains and encodes the differential motion vector in order to calculate the rate-distortion cost, the differential motion vector encoder 230 can output the differential motion vector data encoded by the predicted motion vector selector 220 without separately encoding the differential motion vector. Methods of encoding the differential motion vector may include entropy coding methods such as a fixed length coding, a variable length coding, an arithmetic coding, etc.

The predicted motion vector encoder 240 encodes a predicted motion vector index indicating the predicted motion vector selected by the predicted motion vector selector 220. Methods of encoding the predicted motion vector index may include entropy coding methods such as a fixed length coding, a variable length coding, an arithmetic coding, etc.

For example, if it is assumed that the predicted candidate motion vector set selected by the predicted candidate motion vector set selector 210 is $\{MV_a, MV_{H.264}\}$, a predicted motion vector index of $MV_a$ is "0", and a predicted motion vector index of $MV_{H.264}$ can be set to "1". Accordingly, in this event, since there are only two predicted candidate motion vectors within the predicted candidate motion vector set, an index data generated by encoding the predicted motion vector index can be generated as 1 bit having a value of "0" or "1". Here, in order to correctly reconstruct the predicted motion vector index in the video decoding apparatus or the motion vector decoding apparatus, a predicted motion vector index for a predicted candidate motion vector included in each set for each predicted candidate motion vector set should be equally preset and stored in the video encoding apparatus 100 and the video decoding apparatus or the motion vector encoding apparatus 110 and the motion vector decoding apparatus.

Figure 5:
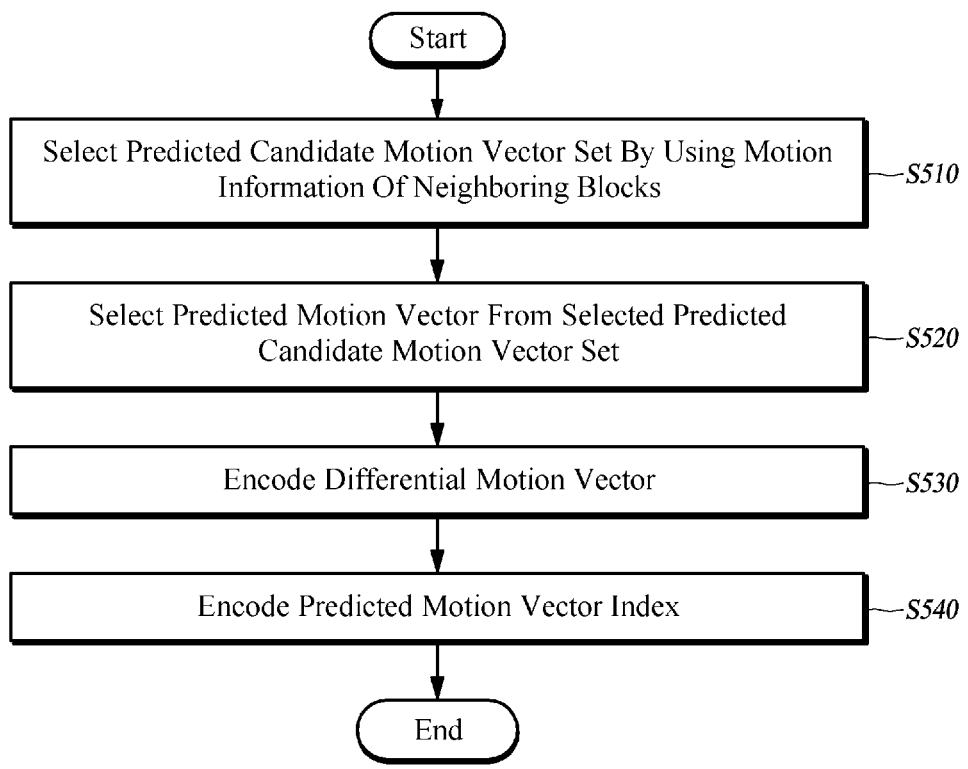
FIG. 5 is a flowchart illustrating a motion vector encoding method according to an aspect of the present disclosure.

FIG. 5 is a flowchart illustrating a motion vector encoding method according to an aspect of the present disclosure.

According to the motion vector encoding method according to an aspect of the present disclosure, the motion vector encoder 110 selects one predicted candidate motion vector set from a plurality of predicted candidate motion vector sets by using motion information of neighboring blocks of a current block at step S510, selects one predicted candidate motion vector from predicted candidate motion vectors within the selected predicted candidate motion vector set as a predicted motion vector at step S520, encodes a differential motion vector, which is a difference between a current motion vector, which is a motion vector of the current block, and the selected predicted motion vector at step S530, and encodes a predicted motion vector index indicating the selected predicted motion vector at step S540.

At step S510, the motion vector encoder 110 determines whether there is a camera motion by using the motion information of the neighboring blocks, and can select one predicted candidate motion vector set based on the determined camera motion.

Further, at step S510, the motion vector encoder 110 determines object motions of the neighboring blocks by using the motion information of the neighboring blocks, and can select one predicted candidate motion vector set based on the determined object motions of the neighboring blocks. To this end, the motion vector encoder 110 can determine the object motions of the neighboring blocks by using predicted motion vectors of the neighboring blocks.

In addition, at step S510, the motion vector encoder 110 determines the object motions of the neighboring blocks by using the motion information of the neighboring blocks, selects a predicted candidate motion vector based on the determined object motions, determines whether there is the camera motion by using the motion information of the neighboring blocks and selects a predicted candidate motion vector based on the determined camera motion, and can select a predicted candidate motion vector set including the predicted candidate motion vector selected based on the object motions and the predicted candidate motion vector selected based on the camera motion from a plurality of predicted candidate motion vector sets as one predicted candidate motion vector set.

Figure 6:
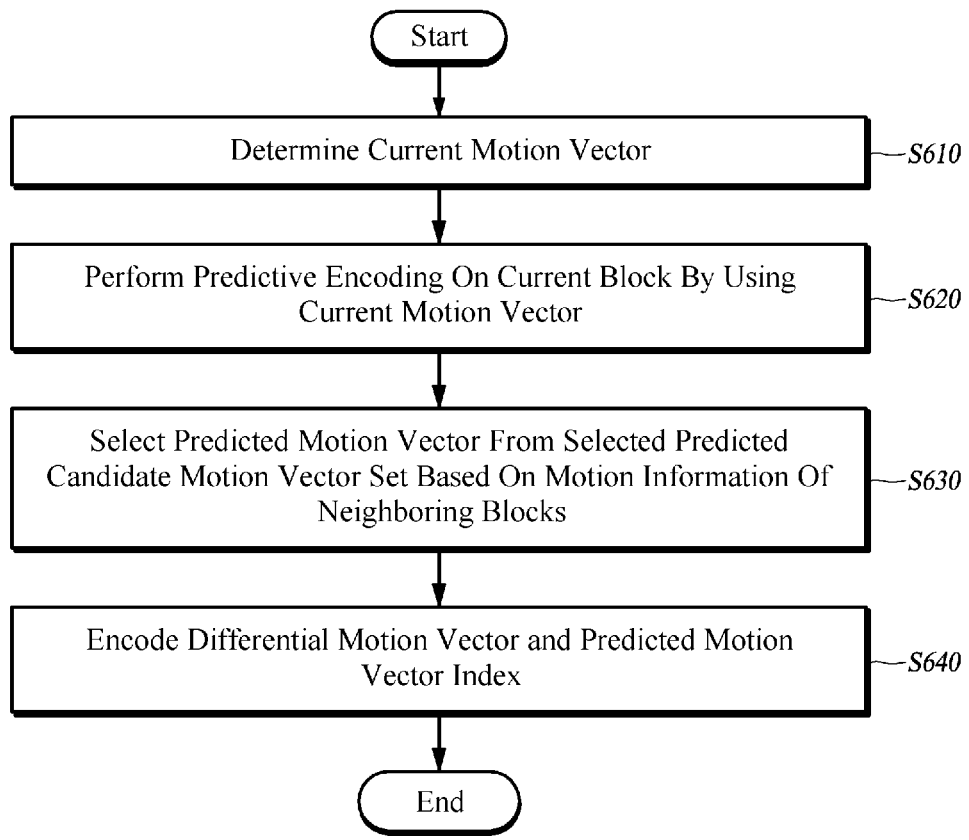
FIG. 6 is a flowchart illustrating a video encoding method according to an aspect of the present disclosure.

FIG. 6 is a flowchart illustrating a video encoding method according to an aspect of the present disclosure.

According to the video encoding method according to an aspect of the present disclosure, the video encoding apparatus 100 determines a current motion vector of a current block at step S610, performs a predictive encoding on the current block by using the determined current motion vector at step S620, selects a predicted motion vector from a predicted candidate motion vector set selected based on motion information of neighboring blocks of the current block among a plurality of predicted candidate motion vector sets at step S630, and encodes a differential motion vector, which is a difference between the current motion vector and the selected predicted motion vector, and a predicted motion vector index indicating the selected predicted motion vector at step S640.

Figure 7:
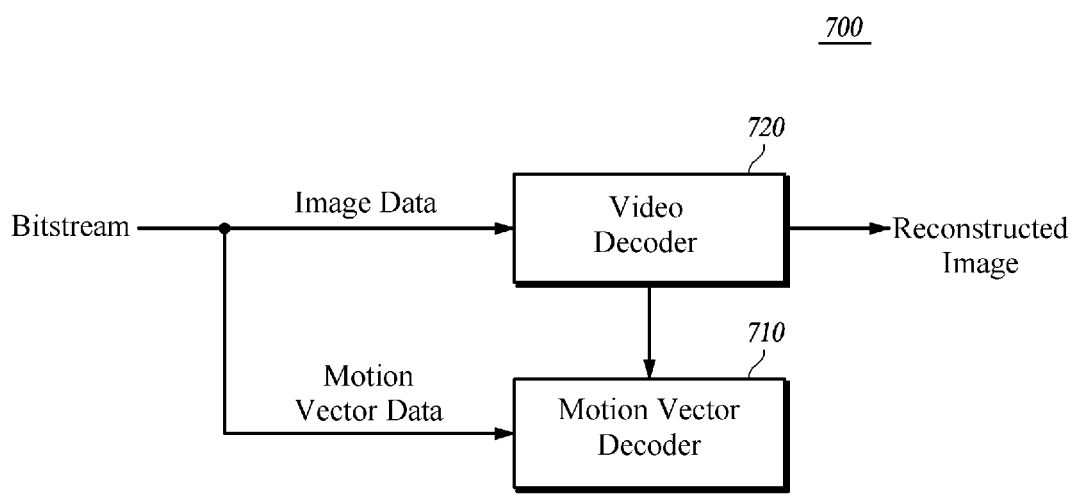
FIG. 7 is a block diagram schematically illustrating a video decoding apparatus according to an aspect of the present disclosure.

FIG. 7 is a block diagram illustrating a video decoding apparatus according to an aspect of the present disclosure.

The video decoding apparatus 700 according to an aspect of the present disclosure may include a motion vector decoder 710 and a video decoder 720.

The motion vector decoder 710 reconstructs a differential motion vector and a predicted motion vector index by decoding motion vector data extracted from a bitstream, selects one predicted candidate motion vector set from a plurality of predicted candidate motion vector sets by using motion information of neighboring blocks of a current block, selects a predicted candidate motion vector identified by the reconstructed predicted motion vector index from the selected predicted candidate motion vector set as a predicted motion vector, and reconstructs a current motion vector of the current block by adding the reconstructed differential motion vector and the selected predicted motion vector. The motion vector decoder 710 will be discussed in the following description with reference to FIG. 8 in more detail.

The video decoder 720 reconstructs the current block by performing a predictive encoding on image data extracted from the bitstream by using the reconstructed current motion vector. To this end, the video decoder 720 may include a decoder, an inverse quantizer and inverse transformer, a predictor, an adder, a deblocking filter, a memory, etc. Here, the decoder reconstructs a transformed and quantized coefficient by decoding the image data extracted from the bitstream. The inverse quantizer and inverse transformer reconstructs a residual block by inversely quantizing and inversely transforming the reconstructed transformed and quantized coefficient. The predictor generates a predicted block by compensating for motion of a current block by using the current motion vector of the current block reconstructed by the motion vector decoder 710. The adder reconstructs the current block by adding the reconstructed residual block to the predicted block. The reconstructed current block is deblocking-filtered by the deblocking filter, accumulated in the unit of pictures, and output as a reconstructed image or stored in the memory so that the predictor uses the stored current block for prediction of a next block or a next picture.

Figure 8:
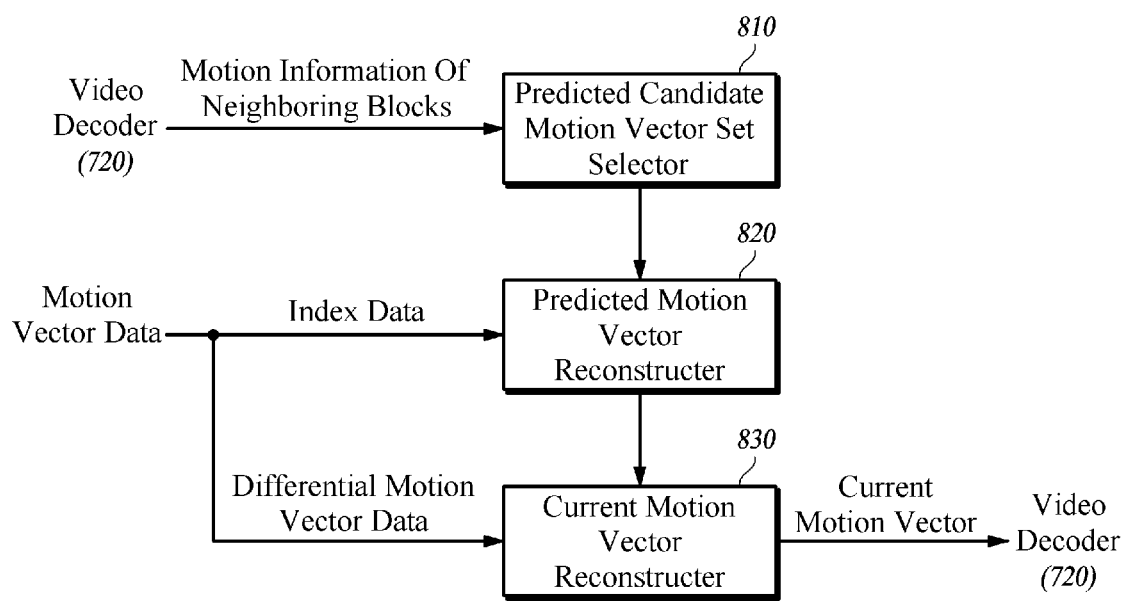
FIG. 8 is a block diagram schematically illustrating a motion vector decoding apparatus according to an aspect of the present disclosure.

FIG. 8 is a block diagram illustrating a motion vector decoding apparatus according to an aspect of the present disclosure.

The motion vector decoding apparatus according to an aspect of the present disclosure can be implemented as the motion vector decoder 710 in the video decoding apparatus 700 described with reference to FIG. 7. Hereinafter, for the convenience of description, the motion vector decoding apparatus according to an aspect of the present disclosure is referred to as the motion vector decoder 710.

The motion vector decoder 710 may include a predicted candidate motion vector set 810, a predicted motion vector reconstructor 820, and a current motion vector reconstructor 830.

The predicted candidate motion vector set selector 810 selects one predicted candidate motion vector set from a plurality of predicted candidate motion vector sets by using motion information of neighboring blocks of a current block. Here, since the predicted candidate motion vector set selector 810 is equal or similar to the predicted candidate motion vector set selector described with reference to FIG. 2, its detailed description will be omitted.

The predicted motion vector reconstructor 820 reconstructs a predicted motion vector index by decoding index data extracted from motion vector data, and reconstructs a predicted candidate motion vector identified by the reconstructed predicted motion vector index from the selected predicted candidate motion vector set as a predicted motion vector, That is, the motion vector reconstructor 820 reconstructs the predicted motion vector index by extracting and decoding the index data from the motion vector data, and reconstructs a predicted candidate motion vector identified by the reconstructed predicted motion vector index from predicted candidate motion vectors within the predicted candidate motion vector set selected by the predicted candidate motion vector set selector 810 as a predicted motion vector.

For example, if it is assumed that the predicted candidate motion vector set selected by the predicted candidate motion vector set selector 810 is $\{MV_a, MV_{H.264}\}$, a predicted motion vector index of $MV_a$ is "0", a predicted motion vector index of $MV_{H.264}$ is set to "1", and index data extracted from motion vector data is a bit with a value of "0", the predicted candidate motion vector identified by the reconstructed predicted motion vector index becomes $MV_a$, so that $MV_a$ can be reconstructed as the predicted motion vector. Here, a predicted motion vector index for a predicted candidate motion vector included in each set for each predicted candidate motion vector set should be equally preset and stored in the video encoding apparatus 100 and the video decoding apparatus 700 or the motion vector encoding apparatus 110 and the motion vector decoding apparatus 710.

The current motion vector reconstructor 830 reconstructs a differential motion vector by decoding differential motion vector data extracted from motion vector data, and reconstructs a current motion vector of a current block by adding the reconstructed differential motion vector and the reconstructed predicted motion vector. That is, the current motion vector reconstructor 830 extracts and decodes the differential motion vector data from the motion vector data, and reconstructs the current motion vector by adding the reconstructed differential motion vector and the predicted motion vector reconstructed by the predicted motion vector reconstructor 820.

Figure 9:
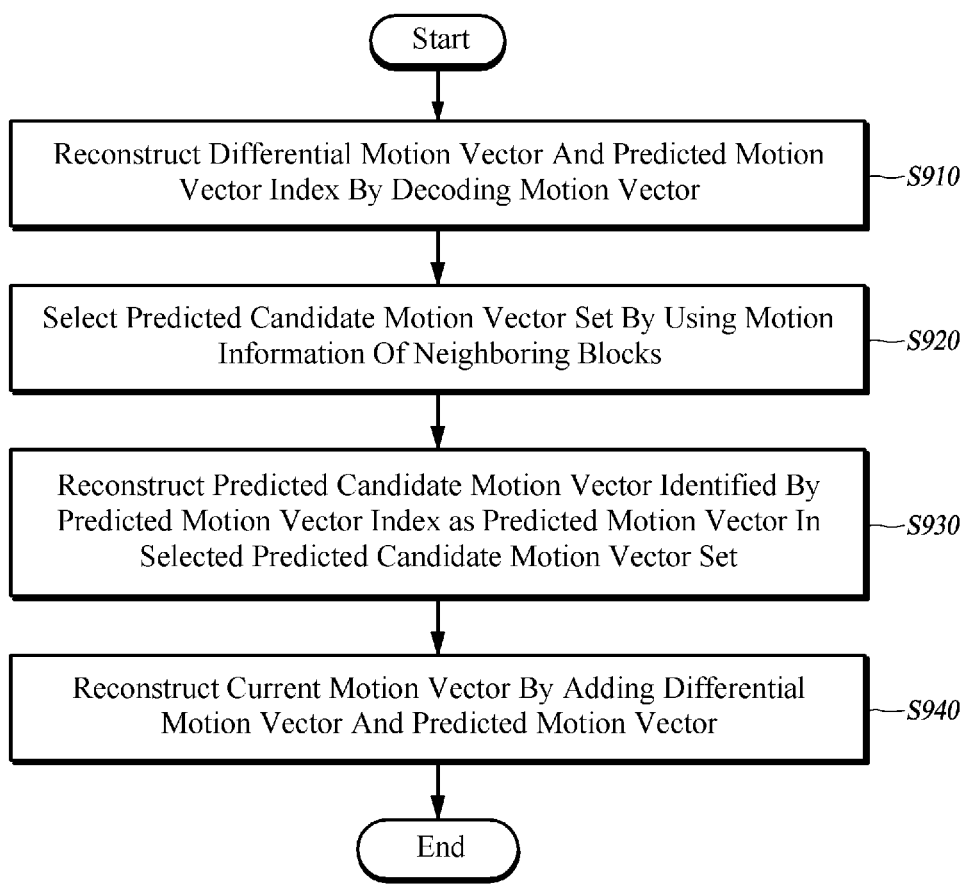
FIG. 9 is a flowchart illustrating a motion vector decoding method according to an aspect of the present disclosure.

FIG. 9 is a flowchart illustrating a motion vector decoding method according to an aspect of the present disclosure.

According to the motion vector decoding method according to an aspect of the present disclosure, the motion vector decoder 710 reconstructs a differential motion vector and a predicted motion vector index by decoding index data and differential motion vector data extracted from motion vector data at step S910, selects one predicted candidate motion vector set from a plurality of predicted candidate motion vector sets by using motion information of neighboring blocks of a current block at step S920, reconstructs a predicted candidate motion vector identified by the reconstructed predicted motion vector index from the selected predicted candidate motion vector set as a predicted motion vector at step S930, and reconstructs a current motion vector of the current block by adding the reconstructed differential motion vector and the predicted motion vector at step S940.

At step S920, the motion vector decoder 710 determines whether there is a camera motion by using the motion information of the neighboring blocks, and can select one predicted candidate motion vector set based on the determined camera motion.

Further, at step S920, the motion vector decoder 710 determines object motions of the neighboring blocks by using the motion information of the neighboring blocks, and can select one predicted candidate motion vector set based on the determined object motions of the neighboring blocks. To this end, the motion vector encoder 110 can determine the object motions of the neighboring blocks by using predicted motion vectors of the neighboring blocks.

In addition, at step S920, the motion vector decoder 710 determines the object motions of the neighboring blocks by using the motion information of the neighboring blocks, selects a predicted candidate motion vector based on the determined object motions, determines whether there is the camera motion by using the motion information of the neighboring blocks and selects a predicted candidate motion vector based on the determined camera motion, and can select a predicted candidate motion vector set including the predicted candidate motion vector selected based on the object motions and the predicted candidate motion vector selected based on the camera motion from a plurality of predicted candidate motion vector sets as one predicted candidate motion vector set.

Figure 10:
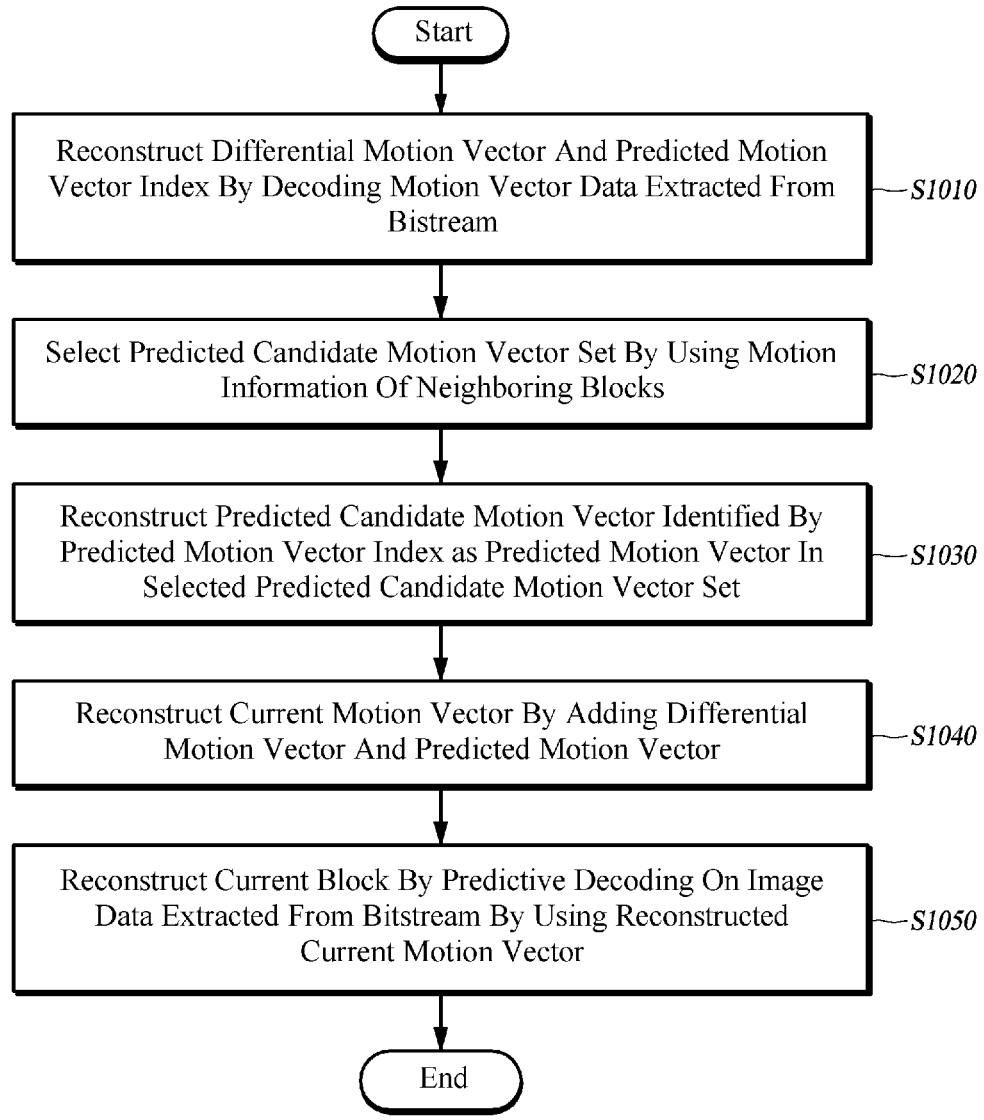
FIG. 10 is a flowchart illustrating a video decoding method according to an aspect of the present disclosure.

FIG. 10 is a flowchart illustrating a video decoding method according to an aspect of the present disclosure.

According to the video decoding method according to an aspect of the present disclosure, the video decoding apparatus 700 reconstructs a differential motion vector and a predicted motion vector index by decoding motion vector data extracted from a bitstream at step S1010, selects one predicted candidate motion vector set from a plurality of predicted candidate motion vector sets by using motion information of neighboring blocks of a current block at step S1020, selects a predicted candidate motion vector identified by the reconstructed predicted motion vector index from the selected predicted candidate motion vector set as a predicted motion vector at step S1030, reconstructs a current motion vector of the current block by adding the reconstructed differential motion vector and the selected predicted motion vector at step S1040, and can reconstruct the current block by performing a predictive decoding on image data from extracted from the bitstream by using the reconstructed current motion vector.

Meanwhile, although it has been exemplified that the image and the motion vector are predictively encoded and decoded in the unit of blocks, it is not necessary to predictively encode and decode the image and the motion vector in the unit of blocks. For example, the image and the motion vector can be predictive-encoded in a predetermined encoding unit such as the unit of slices, pictures, or sequences instead of blocks, and can be predictively encoded in the unit of undefined various areas, which are not block types.

As described above, according to an aspect of the present disclosure, a predicted motion vector, which is more similar to a motion vector to be encoded, can be selected by adaptively selecting a predicted candidate motion vector set suitable for a corresponding encoding unit for each predetermined encoding unit such as the unit of blocks, slices, pictures, sequences, etc. through the use of motion information of reconstructed neighboring blocks, which have been already encoded and decoded. Therefore, it is not necessary to encode information on the selected predicted candidate motion vector set while a differential motion vector size is reduced, so that the amount of bits spent on encoding the motion vector can be reduced and thus the video compression efficiency can be improved.

In the description above, although all of the components of the embodiments of the present disclosure may have been explained as assembled or operatively connected as a unit, the present disclosure is not intended to limit itself to such embodiments. Rather, within the objective scope of the present disclosure, the respective components may be selectively and operatively combined in any numbers. Every one of the components may be also implemented by itself in hardware while the respective ones can be combined in part or as a whole selectively and implemented in a computer program having program modules for executing functions of the hardware equivalents. Codes or code segments to constitute such a program may be easily deduced by a person skilled in the art. The computer program may be stored in non-transitory computer readable media, which in operation can realize the aspects of the present disclosure. Examples of the non-transitory computer readable media include magnetic recording media, such as a hard disk, a floppy disk, and a magnetic tape, and optical recording media, such as a floptical disk, and hardware devices that are specially configured to store and execute program instructions, such as a ROM, a random access memory (RAM), and a flash memory.

According to various embodiments of the present disclosure as described above, as a motion vector is encoded after an efficient predicted candidate motion vector set is selected, it is possible to reduce a size of a differential motion vector to be encoded not required to encode additional information indicating the selected predicted candidate motion vector set. Therefore, the compression efficiency of the motion vector is improved and thus the compression efficiency of an image can be improved.

In addition, terms like 'include', 'comprise', and 'have' should be interpreted in default as inclusive or open rather than exclusive or closed unless expressly defined to the contrary. All the terms that are technical, scientific or otherwise agree with the meanings as understood by a person skilled in the art unless defined to the contrary. Common terms as found in dictionaries should be interpreted in the context of the related technical writings not too ideally or impractically unless the present disclosure expressly defines them so.

Although exemplary embodiments of the present disclosure have been described for illustrative purposes, those skilled in the art will appreciate that various modifications, additions and substitutions are possible, without departing from the spirit and scope of the claimed invention. Specific terms used in this disclosure and drawings are used for illustrative purposes and not to be considered as limitations of the present disclosure. Therefore, exemplary aspects of the present disclosure have not been described for limiting purposes. Accordingly, the scope of the claimed invention is not to be limited by the above aspects but by the claims and the equivalents thereof.

The invention claimed is:

1. A video encoding apparatus using an inter-prediction, comprising:
   a video encoder configured to
      determine a current motion vector of a current block,
      predict the current block by using the determined current motion vector, and
      encode a residual block representing a difference between the predicted block and the current block; and
   a motion vector encoder configured to
      determine a candidate predicted motion vector set based on motion information of neighboring blocks of the current block, wherein the candidate predicted motion vector set has two candidate predicted motion vectors for the current motion vector,
      select a predicted motion vector of the current motion vector from among the two candidate predicted motion vectors in the candidate predicted motion vector set, and
      encode a differential vector representing a difference between the current motion vector and the selected predicted motion vector and a predicted motion vector index indicating the selected predicted motion vector among the two candidate predicted motion vectors.

2. The apparatus of claim 1, wherein the neighboring blocks of the current block include blocks located at left, upper, upper right and upper left sides of the current block.

3. The apparatus of claim 1, wherein the motion vector encoder is configured to
 determine whether there is a camera motion based on the number of the neighboring blocks of which motion vectors are zero vectors, and
 determine the candidate predicted motion vector set based on whether there is the camera motion.

4. The apparatus of claim 1, wherein the motion vector encoder is configured to
 determine object motions of the neighboring blocks by using the motion information of the neighboring blocks, and
 determine the candidate predicted motion vector set based on the determined object motions of the neighboring blocks.

5. The apparatus of claim 1, wherein the object motions of the neighboring blocks is determined by using predicted motion vectors of the neighboring blocks.

6. The apparatus of claim 1, wherein the motion vector encoder is configured to
 determine object motions of the neighboring blocks by using the motion information of the neighboring blocks and selecting a first predicted candidate motion vector based on determined object motions,
 determine whether there is a camera motion by using the motion information of the neighboring blocks and selecting a second predicted candidate motion vector based on a determined camera motion, and
 generate the candidate predicted motion vector set including the first predicted candidate motion vector and the second predicted candidate motion vector.

7. The apparatus of claim 1, wherein the differential vector is encoded by an arithmetic coding.

8. The apparatus of claim 1, wherein the predicted motion vector index is encoded by an arithmetic coding.

9. A video decoding apparatus using an inter-prediction, comprising:
 a motion vector decoder configured to
  reconstruct a differential vector and a predicted motion vector index by decoding motion vector data included in a bitstream,
  determine a candidate predicted motion vector set by using motion information of neighboring blocks of a current block, wherein the candidate predicted motion vector set has two candidate predicted motion vectors for a current motion vector of the current block,
  select a candidate predicted motion vector identified by the reconstructed predicted motion vector index from among the two candidate predicted motion vectors in the candidate predicted motion vector set, as a predicted motion vector of the current motion vector, and
  reconstruct the current motion vector of the current block by adding the reconstructed differential vector and the selected predicted motion vector; and
 a video decoder configured to
  generate a predicted block of the current block by using the reconstructed current motion vector,
  reconstruct a residual block from an image data extracted from the bitstream, and
  reconstruct the current block by adding the predicted block and the residual block.

10. The apparatus of claim 9, wherein the neighboring blocks of the current block includes blocks located at left, upper, upper right and upper left sides of the current block.

11. The apparatus of claim 9, wherein the motion vector decoder is configured to
 determine whether there is a camera motion based on the number of the neighboring blocks of which motion vectors are zero vectors, and
 determine the candidate predicted motion vector set based on whether there is the camera motion.

12. The apparatus of claim 1, wherein the motion vector decoder is configured to
 determine object motions of the neighboring blocks by using the motion information of the neighboring blocks, and
 determine the candidate predicted motion vector set based on the determined object motions of the neighboring blocks.

13. The apparatus of claim 9, wherein the differential vector is data encoded by an arithmetic coding.

14. The apparatus of claim 9, wherein the predicted motion vector index is data encoded by an arithmetic coding.

* * * * *